(12) United States Patent
Park (10) Patent No.: US 7,541,986 B2
(45) Date of Patent: Jun. 2, 2009

(54) INTERNAL ANTENNA AND MOBILE TERMINAL HAVING THE INTERNAL ANTENNA

(75) Inventor: Byung Duck Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/896,059

(22) Filed: Jul. 22, 2004

(65) Prior Publication Data

US 2005/0017910 A1 Jan. 27, 2005

(30) Foreign Application Priority Data

Jul. 23, 2003 (KR) ................. 10-2003-0050710
Jul. 23, 2003 (KR) ................. 10-2003-0050711

(51) Int. Cl.
*H01Q 1/24* (2006.01)

(52) U.S. Cl. .................. 343/702; 343/700 MS (58) Field of Classification Search .......... 343/700 MS, 343/702, 745, 841, 846; 455/90.1–90.3, 455/550.1; 361/816–818
See application file for complete search history.

(56) References Cited

U.S. PATENT DOCUMENTS

| | | | | |
|---|---|---|---|---|
| 5,832,080 | A * | 11/1998 | Beutler et al. | 379/433.13 |
| 6,157,546 | A | 12/2000 | Petty et al. | 361/816 |
| 6,285,324 | B1 * | 9/2001 | Korisch et al. | 343/700 MS |
| 6,342,869 | B1 | 1/2002 | Edvardsson et al. | 343/841 |
| 6,392,603 | B1 * | 5/2002 | Kurz et al. | 343/702 |
| 6,486,837 | B2 * | 11/2002 | Spiegel et al. | 343/702 |
| 6,819,939 | B2 * | 11/2004 | Masamura | 455/550.1 |
| 6,867,746 | B2 * | 3/2005 | Mendolia et al. | 343/841 |
| 6,952,340 | B2 * | 10/2005 | Son et al. | 361/680 |
| 6,990,355 | B2 * | 1/2006 | Ueyama et al. | 455/550.1 |
| 7,081,854 | B2 * | 7/2006 | Ying et al. | 343/702 |
| 7,236,065 | B2 * | 6/2007 | Hyvonen | 333/101 |
| 2001/0014547 | A1 | 8/2001 | Soh | 439/67 |
| 2003/0103014 | A1 | 6/2003 | Birnbaum et al. | 343/841 |

FOREIGN PATENT DOCUMENTS

| | | |
|---|---|---|
| CN | 1308782 A | 8/2001 |
| CN | 1409941 A | 4/2003 |
| EP | 0407072 | 6/1990 |

(Continued)

OTHER PUBLICATIONS

European Search Report Dated Aug. 23, 2005.

(Continued)

*Primary Examiner*—Douglas W Owens
*Assistant Examiner*—Jimmy T Vu
(74) *Attorney, Agent, or Firm*—Ked & Associates LLP (57) ABSTRACT

A mobile terminal includes a terminal case, a main PCB inside the terminal case mounting various circuit components thereon, and an internal antenna fixed on the main PCB. The internal antenna can transmit and receive radio waves bearing voice and image information to and from the main PCB and shield electromagnetic wave generating parts mounted on the main PCB. Thus, embodiments of an internal antenna, a mobile terminal and methods thereof can reduce size and costs, and can shield RF elements or the like discharging a large amount of electromagnetic waves or circuit components among parts installed on the main PCB so that leakage of electromagnetic waves can be reliably reduced or prevented.

36 Claims, 8 Drawing Sheets

FOREIGN PATENT DOCUMENTS

| | | |
|---|---|---|
| JP | 64-057798 | 3/1989 |
| JP | 08-070195 | 3/1996 |
| JP | 10-022671 | 1/1998 |
| JP | 10-150285 | 6/1998 |
| JP | 2000-286584 | 10/2000 |
| JP | 2001-111321 | 4/2001 |
| JP | 2002-111381 | 4/2002 |
| JP | 2002-319808 | 10/2002 |
| KR | 2001-0102016 | 11/2001 |
| WO | WO03/103361 | 12/2003 |

OTHER PUBLICATIONS

Korean Office Action Dated Sep. 9, 2005.
European Search Report., dated Aug. 23, 2005.
Chinese Office Action dated Dec. 22, 2006.
Japanese Office Action dated Dec. 4, 2006.

* cited by examiner

INTERNAL ANTENNA AND MOBILE TERMINAL HAVING THE INTERNAL ANTENNA

BACKGROUND OF THE INVENTION

1. Field of the Invention

The present invention relates to a mobile terminal having an internal antenna.

2. Background of the Related Art

In general, a mobile terminal is a wireless communication device that a user can carry along and make a call while traveling. Beyond simple voice transmission and reception, recently, mobile terminals have been fortified in multimedia functions to allow a large amount of information to be transmitted and received. In line with the tendency, performance of an antenna plays a critical role in mobile terminals.

In addition, as mobile phones are made smaller and more compact in size, the antenna of a mobile terminal is installed in the mobile terminal, rather than exposed. Such an internal antenna is applied to various fields such as a bluetooth, a wireless LAN, a GSM, a CDMA, or the like, and a local area wireless communication.

Figure 1:
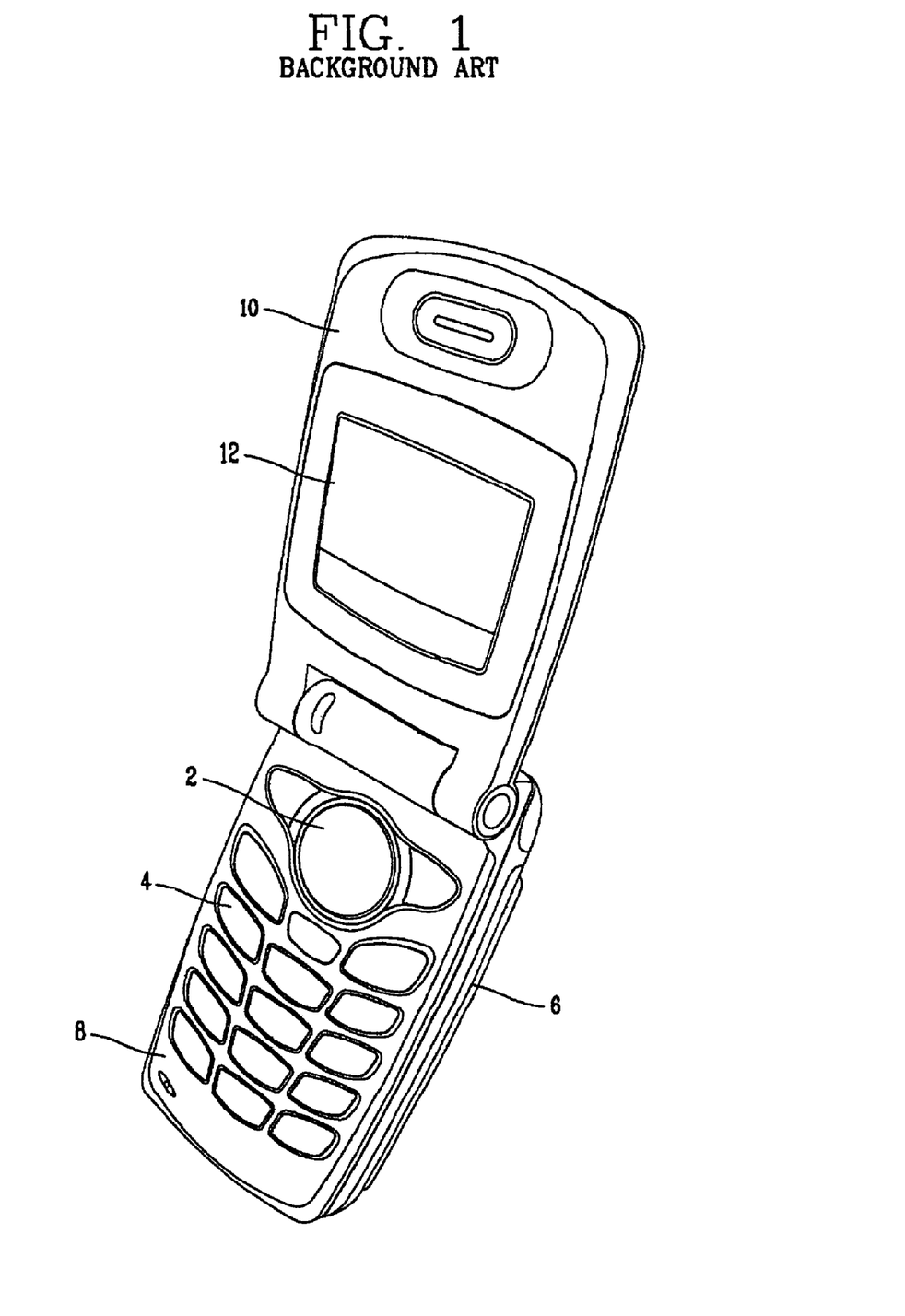
FIG. 1 is a diagram showing a perspective view of a related art mobile terminal having an internal antenna.

FIG. 1 shows a related art mobile terminal. As shown in FIG. 1, the mobile terminal includes a first or main body 8 having various circuit components embedded therein, a menu button 2 and a dial button 4 provided at its front surface and a battery 6 mounted at its rear surface. A second body or folder 10 displaying various information using a display 12 or the like can be hinged or the like at the main body 8.

Figure 2:
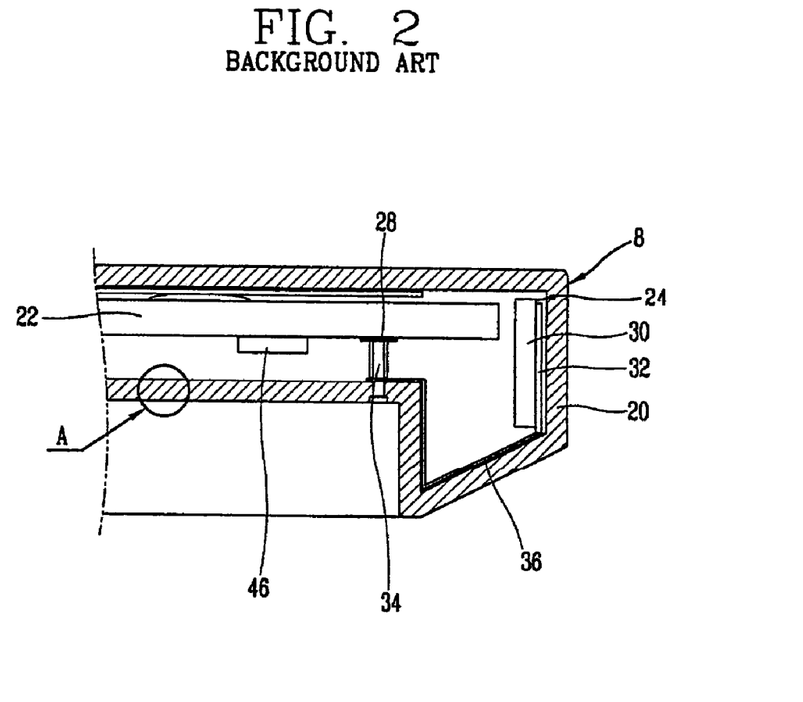
FIG. 2 is a diagram showing a sectional view of a main body of the related art mobile terminal.

FIG. 2 is a partial sectional view of the related art mobile terminal. As shown in FIG. 2, the main body 8 of the mobile terminal includes a case 20 having a space therein, a main PCB 22 housed inside the case 20, and an internal antenna 24 separately mounted inside the case 20 and electrically connected to the main PCB 22 to transmit and receive radio waves bearing voice and image information or the like to and from the main PCB 22.

Figure 3:
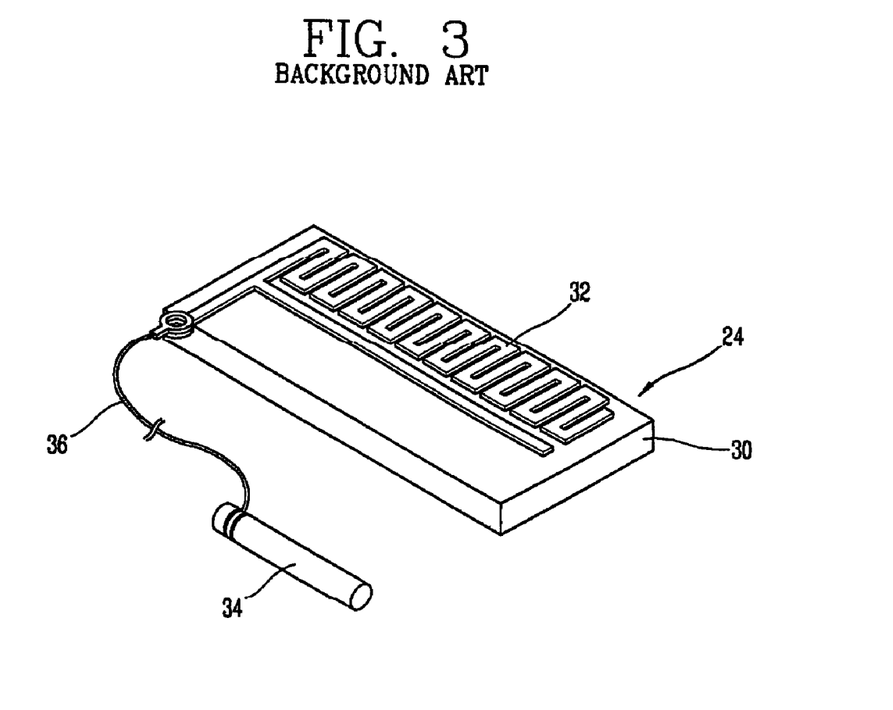
FIG. 3 is a diagram showing a perspective view of the internal antenna in accordance with the related art mobile terminal of FIG. 2.

As shown in FIG. 3, the internal antenna 24 includes a carrier 30 fixed at an inner side of the case 20, a radiator 32 formed in a certain pattern at a surface of the carrier 30 and radiating radio wave that the main PCB 22 transmits and receives, and a feeding terminal 34 connected to the radiator 32 by wire 36. The feeding terminal 34 is electrically connected to an antenna terminal unit 28 of the main PCB 22.

In the related art mobile terminal having the internal antenna, voice or image information signal generated from the main PCB 22 is radiated from the radiator 32 attached on the carrier 30 through the feeding terminal 34 connected to the antenna terminal unit 28 of the main PCB 22 and the wire 36 connected therebetween. Further, a radio wave signal received through the radiator 32 is transmitted to the main PCB 22 through the wire 36 connected to the radiator 32 and the feeding terminal 34.

Figure 4:
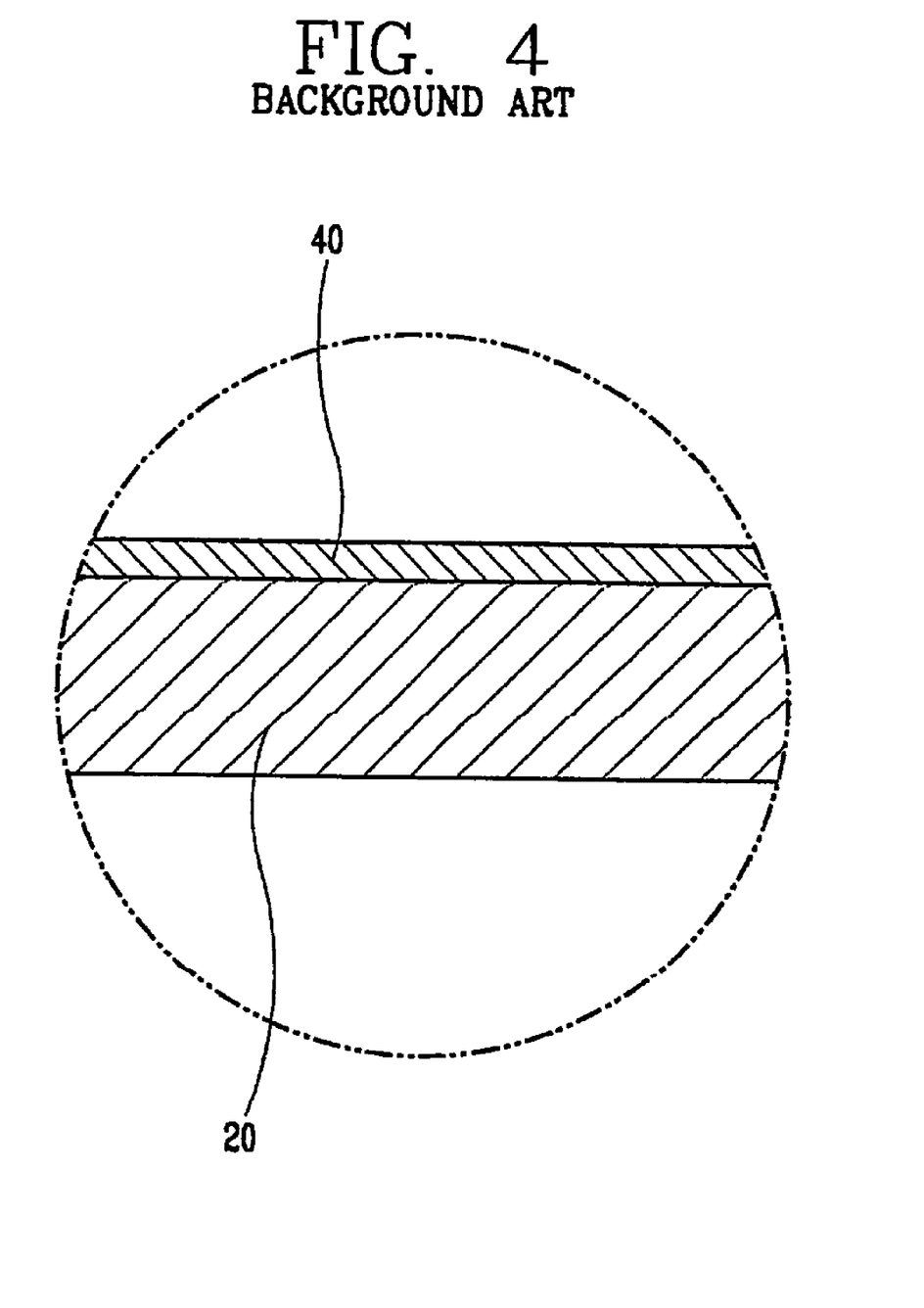
FIG. 4 is a diagram showing an enlarged view of a portion 'A' of FIG. 2.

As shown in FIG. 4, the main body case 20 is injection-molded, and an electromagnetic wave shielding film 40 having a certain thickness is formed as copper and nickel are sequentially plated at an inner side thereof, in order to prevent electromagnetic wave generated from parts 46 attached to the main PCB 22 from being discharged outwardly.

However, as described above, the related art internal antenna-installed mobile terminal has various disadvantages and problems. For example, since the carrier 30, which has the radiator 32 for transmitting and receiving voice and image signals attached on its surface, is mounted inside the main body case 20 and connected to the main PCB 22 through the wire 36, a space for installing the internal antenna 24 must be secured inside the main body case 20. This results in an increase in size of the main body case 20, and accordingly, the overall size of the terminal is increased.

In addition, with the shielding film 40 coated on the inner side of the main body case 20, it is not possible to completely shield the electromagnetic wave generated from the parts 46 installed at the main PCB 22. Thus, electromagnetic wave generated from parts, such as an RF (Radio Frequency) element, which discharges a large amount of electromagnetic wave can be leaked outwardly.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an internal antenna configured to be mounted on a PCB in a terminal, a mobile terminal and methods of assembling the same.

Another object of the present invention is to provide an internal antenna configured to be mounted on a main PCB in a mobile terminal to make a terminal having the internal antenna compact.

Another object of the present invention is to provide a mobile terminal having an internal antenna configured to be mounted on a main PCB and methods thereof so that no additional space is needed for installing the internal antenna inside a main body of the terminal.

Another object of the present invention is to provide an internal antenna capable of reducing or preventing leakage of electromagnetic waves by shielding an RF element among parts installed in a main PCB that discharge electromagnetic waves, a mobile terminal having the internal antenna and methods thereof.

Another object of the present invention is to provide an internal antenna configured to be mounted on a main PCB and capable of reducing or preventing leakage of electromagnetic waves by shielding an RF element among parts installed in a main PCB that discharge electromagnetic wave, a mobile terminal having the internal antenna and methods thereof.

Another object of the present invention is to provide a mobile terminal having a PCB including a first section grouping mounted circuits configured to emit electromagnetic waves.

Another object of the present invention is to provide a mobile terminal having a PCB including a first section grouping mounted circuits configured to emit electromagnetic waves and a groove in the first section.

To achieve at least the above objects in a whole or in part and other advantages and in accordance with the purpose of the present invention, as embodied and broadly described herein, there is provided a mobile terminal that includes a terminal case, a PCB provided inside the terminal case and having various circuit components mounted thereon and an internal antenna mounted on the PCB and configured to transmit and receive radio waves bearing voice and image information to and from the PCB and shield electromagnetic wave generating parts mounted on the PCB.

To further achieve at least the above objects in a whole or in part, there is provided an internal antenna that includes a carrier inside a communication device and configured to shield electromagnetic wave generating parts, a radiator coupled to the carrier and configured to receive and radiate radio waves transmitted to and received from the communication device and a feeding terminal fixed at the carrier and configured to electrically connect the radiator and an antenna terminal part of the communication device.

To further achieve at least the above objects in a whole or in part, there is provided a mobile terminal that includes a terminal case, a main PCB inside the terminal case and configured to have various circuit components mounted thereon and an internal antenna directly mounted on the main PCB and configured to receive and transmit radio waves bearing voice and image information to and from the main PCB.

To further achieve at least the above objects in a whole or in part, there is provided a method for assembling a mobile terminal that includes providing a terminal case, providing a PCB including various circuit components inside the terminal case and shielding an RF wave generating part mounted on the PCB using the internal antenna.

To further achieve at least the above objects in a whole or in part, there is provided a printed circuit board (PCB) for use with a mobile terminal that includes a first part and a second part of the PCB, RF emitting circuits coupled to an upper surface of the first part of the PCB, a groove formed in the first part, and a connector coupled to the upper surface of the first part and extending through the groove.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to preferred embodiments of the present invention, examples of which are illustrated in the accompanying drawings. There can be several embodiments of an internal antenna, a mobile terminal having an internal antenna and methods thereof in accordance with the present invention, of which preferred ones will now be described. However, the present invention is not intended to be limited by the following descriptions of preferred embodiments.

Figure 5:
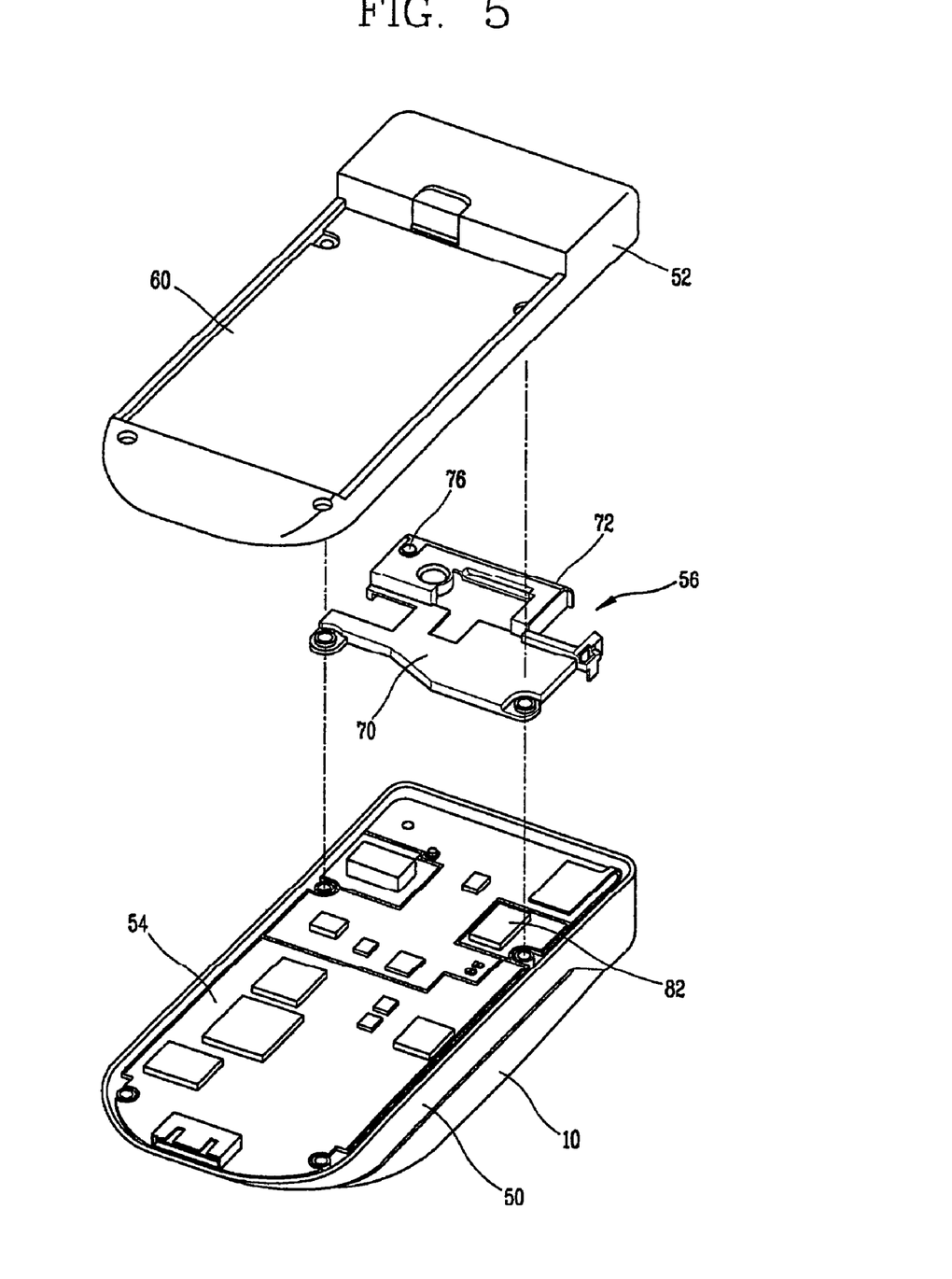
FIG. 5 is a diagram showing an exploded perspective view of a main body of a mobile terminal in accordance with a preferred embodiment of the present invention.
Figure 6:
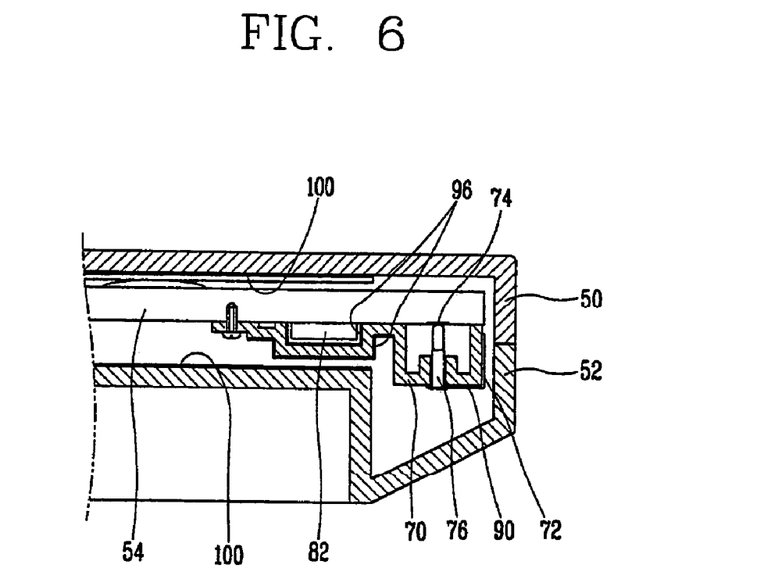
FIG. 6 is a diagram showing a partial sectional view of a main body of the mobile terminal in accordance with a preferred embodiment of the present invention.

FIG. 5 is a diagram showing an exploded perspective view of a main body of a mobile terminal in accordance with one embodiment of the present invention. FIG. 6 is a diagram showing a partial sectional view of the main body of the mobile terminal of FIG. 5.

In accordance with one embodiment of the present invention, a terminal body 8 having an internal antenna can include cases 50 and 52 enclosing a prescribed space therebetween, a main PCB 54 mounted inside the cases 50 and 52 and having various circuit components mounted thereon and an internal antenna 56 mounted on the main PCB 54. The internal antenna 56 can transmit and receive radio waves bearing voice and image information or the like to and from the main PCB 54.

The case 50 is a front case preferably hinged at a folder 10; and the case 52 is a rear case engaged with the front case 50 to have a certain space therebetween. The rear case 52 can include a battery mounting part 60 on which a battery can be mounted.

Figure 7:
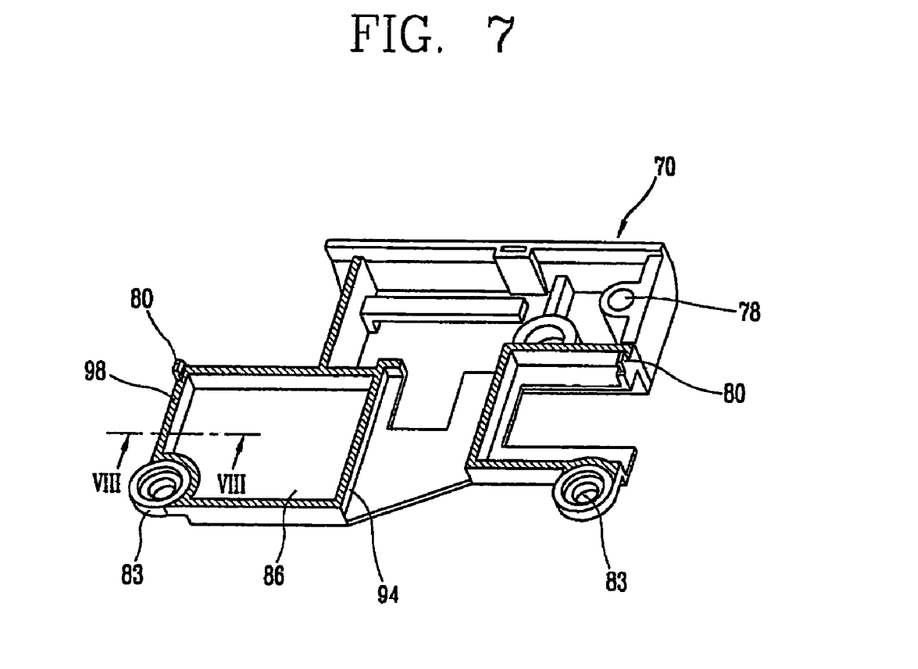
FIG. 7 is a diagram showing a perspective view of a carrier of the internal antenna in accordance with a preferred embodiment of the present invention.

The internal antenna 56 can include a carrier 70 fixed at one side of the main PCB 54, a radiator 72 attached at one side of the carrier 70 and radiating radio wave transmitted to and received from the main PCB 54 and a feeding terminal 76 preferably fixed at the carrier 70 and having one end portion connected to the radiator 72 and the other end portion being in contact with an antenna terminal part 74 of the main PCB 54. As shown in FIG. 7, the carrier 70 can include a fixing hole 78 formed at one side, in which the feeding terminal 76 is insertedly fixed, a plurality of engaging hooks 80 formed at a marginal portion thereof and for attaching to the main PCB 54, and screw engaging holes 83 formed at a corner portion thereof so as to be screw-engaged or the like with the front case 50 and the rear case 52. At one side of the carrier 70, an electromagnetic wave shielding part 86 can shield the RF element 82 mounted on the main PCB 54 to thereby reduce or prevent external radiation of electromagnetic wave generated from the RF element 82. The carrier 70 can be integrally injection-molded and made of a polycarbonate material or the like.

The engaging hooks 80 preferably protrude from a marginal portion of the carrier 70 and lock into a hook groove (not shown) formed at the main PCB 54, whereby the carrier 70 is fixed to the main PCB 54. However, the present invention is not intended to be so limited as other fixing devices (e.g., rigidly attached) can be used for coupling the same.

A connection terminal 90 for electrically coupling the feeding terminal 76 and the radiator 72 is preferably mounted at one side of the fixing hole 78 in which the feeding terminal is insertedly fixed.

For the electromagnetic wave shielding part 86, a barrier wall 94 can be formed in a circumferential direction to cover the RF element 82 when the carrier 70 is attached on the main PCB 54. Further, an electromagnetic wave shielding film 96 can be coated at an inner side and an outer side of the electromagnetic wave shielding part 86 to shield electromagnetic wave. A gasket 98 is preferably installed at an upper surface of the barrier wall 94 of the electromagnetic wave shielding part 86 being in contact with the surface of the main PCB 54 in order to seal the surface of the main PCB 54 and the electromagnetic wave shielding part 86 to shield electromagnetic wave.

The electromagnetic wave shielding film 96 can be formed such that a copper film is coated at the surface of the electromagnetic wave shielding part 86 by spraying or vacuum deposition and a corrosion preventing film made of nickel or stainless steel can then be coated at the surface of the copper film by spraying or vacuum deposition. However, the present invention is not intended to be so limited as other materials and processes can be used to form the electro-magnetic wave shielding film 96 so long as performance criteria are satisfied.

Figure 8:
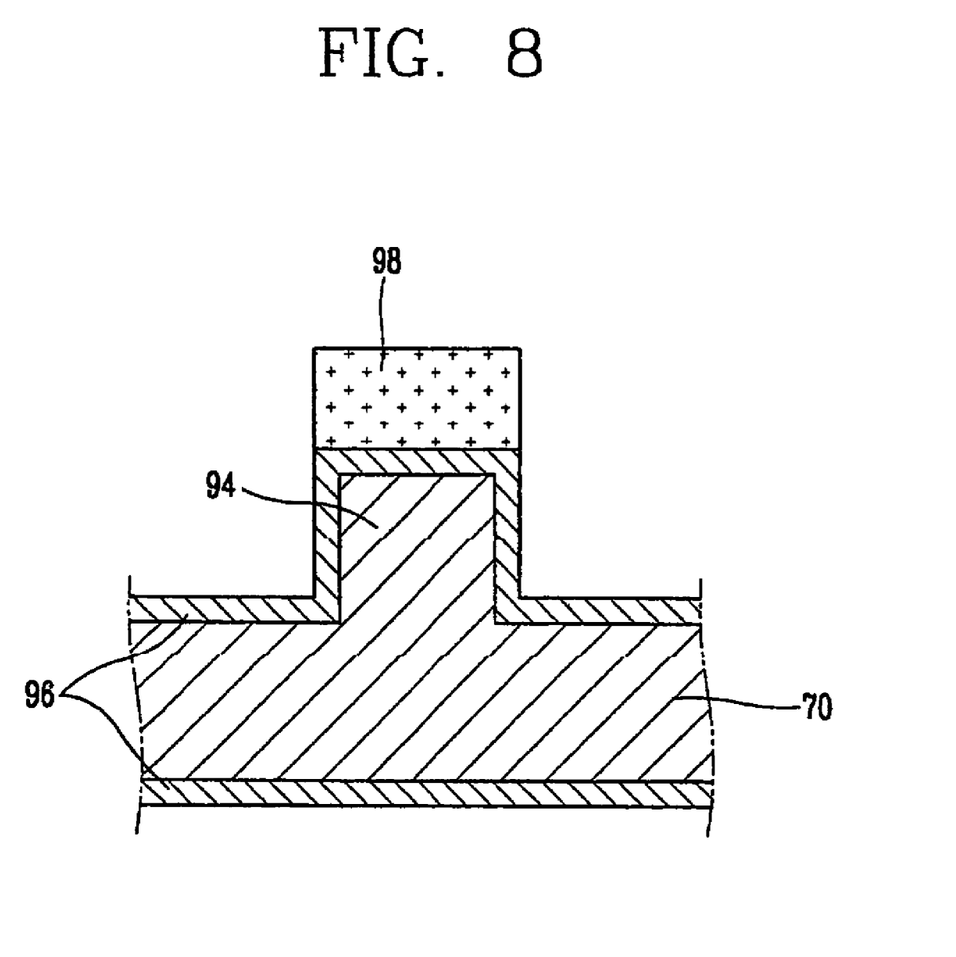
FIG. 8 is a diagram showing a sectional view taken along line VIII-VIII of FIG. 7.

As shown in FIG. 8, the gasket 98 is a silicon material having conductivity and elasticity. The gasket 98 can be elastically tightly attached at a lower surface of the main PCB 54 to perform an electromagnetic wave shielding function and make an electric grounding.

Like the electromagnetic wave shielding part 86 formed at the carrier 70, an electromagnetic wave shielding film 100, which can be formed by sequentially plating copper and nickel, is preferably coated at an inner side of the front case 50 and the rear case 52 in order to additionally reduce or shield electromagnetic wave generated from parts installed on the main PCB 54.

An embodiment of an assembly process of the internal antenna in accordance with the present invention will now be described. The embodiment of the assembly processss can be applied to and will be described using the mobile terminal shown in FIGS. 5-7. However, the present invention is not intended to be so limited In the internal antenna 56, after the feeding terminal 76 is electrically coupled (e.g. fixed) at the carrier 70, the internal antenna 56 is mounted or fixed at one surface (e.g., an upper surface) of the main PCB 54. For example, the hook protrusion 80 (e.g., formed at the marginal portion of the carrier 70) is connected (e.g. locked) into the hook groove (not shown) of the main PCB 54. At this time, as an end portion of the feeding terminal 76 comes in contact with the antenna terminal part 74 of the main PCB 54, the radiator 72 attached to the carrier 70 and the main PCB 54 are electrically coupled. Further, the electromagnetic wave shielding part 86 formed at the carrier 70 is tightly attached to the RF element 82 to cover it, thereby shielding electromagnetic waves.

Then, the front case 50 and the rear case 52 are tightly attached to each other. For example, when the screw is engaged, the screw can pass through the screw engaging holes 83 formed at the carrier 70 to engage the carrier 70 together with the front case 50 and the rear case 52.

In a mobile terminal having the internal antenna 56 assembled as described above, the feeding terminal 76 is coupled to the antenna terminal part 74 of the main PCB 54 and the radiator 72 is installed at one side of the carrier 70 for radiating radio wave signal bearing voice and image information generated from the main PCB 54. The radio wave signal received through the radiator 72 is received by the antenna terminal part 74 of the main PCB 54 after passing through the feeding terminal 76.

Since the RF element 82 of the main PCB 54 is covered by the electromagnetic wave shielding part 86 formed at the carrier 70 and tightly attached to the gasket 98, leakage of electromagnetic wave generated when the RF element 82 operate can be reduced or completely cut off. In other words, double shielding can be made by the electromagnetic wave shielding film 100 formed at the inner sides of the front case 50 and the rear case 52 around the RF element 82 (e.g., where the electromagnetic wave is mostly generated), and leakage of electromagnetic waves is reduced or prevented by the electromagnetic wave shielding film 100 formed at the front case 50 and the rear case 52 at other remaining regions where the electromagnetic wave is slightly generated (e.g., other components coupled to the main PCB 54). Accordingly, reliable and effective electromagnetic wave shielding can be accomplished.

Figure 9:
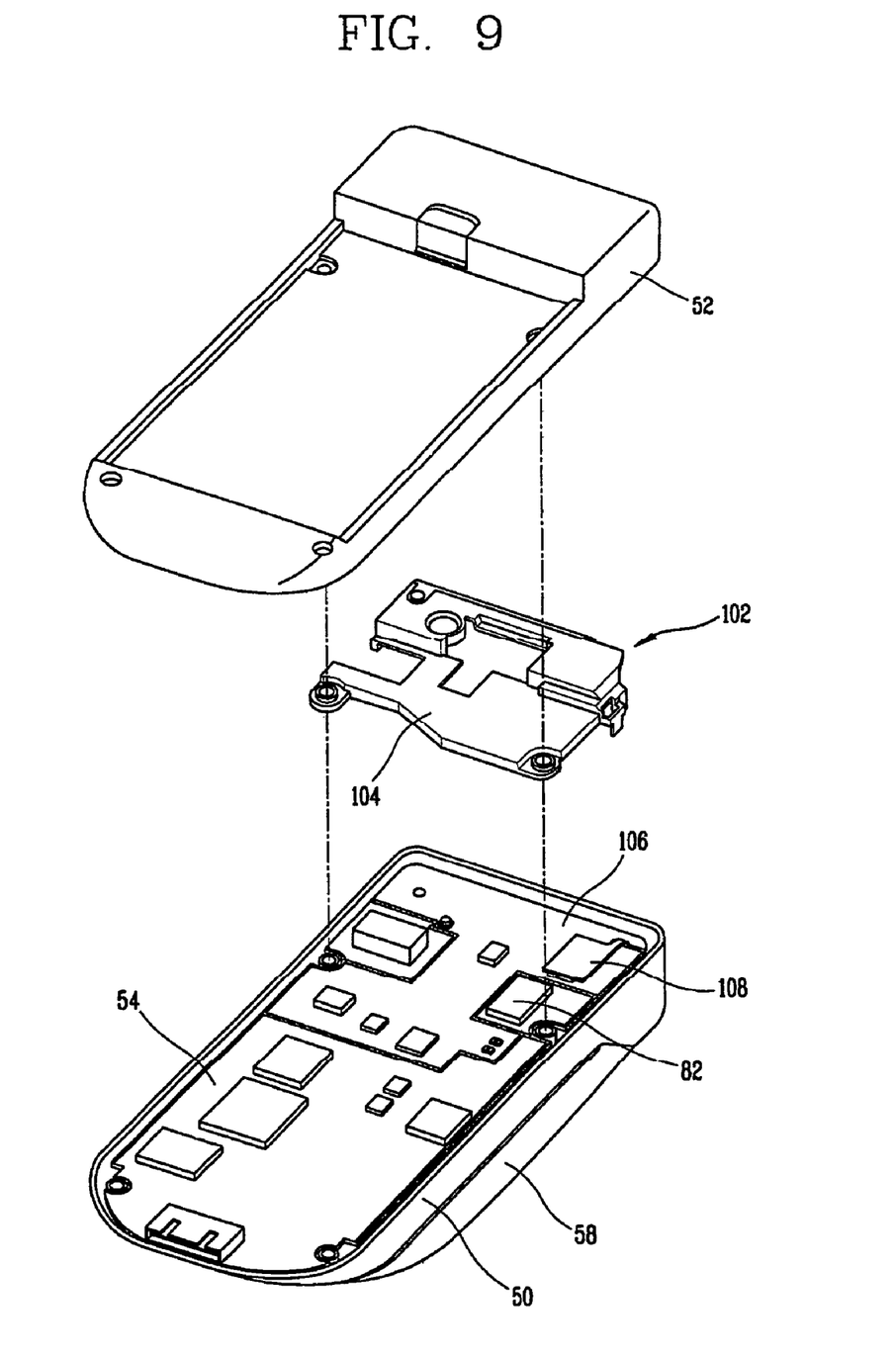
FIG. 9 is a diagram showing an exploded perspective view of a main body of a mobile terminal in accordance with another preferred embodiment of the present invention.
Figure 10:
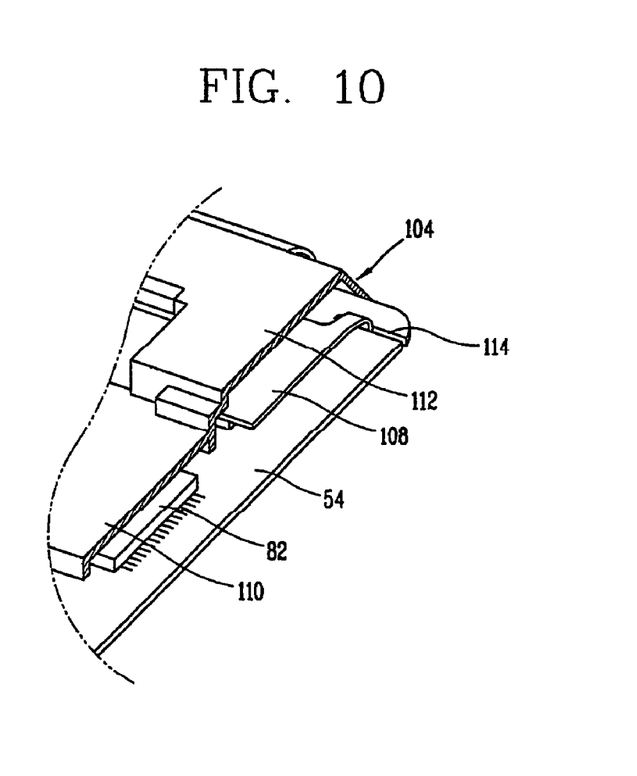
FIG. 10 is a diagram showing a partially cut perspective view of a main body of the mobile terminal in accordance with another embodiment of the present invention.
Figure 11:
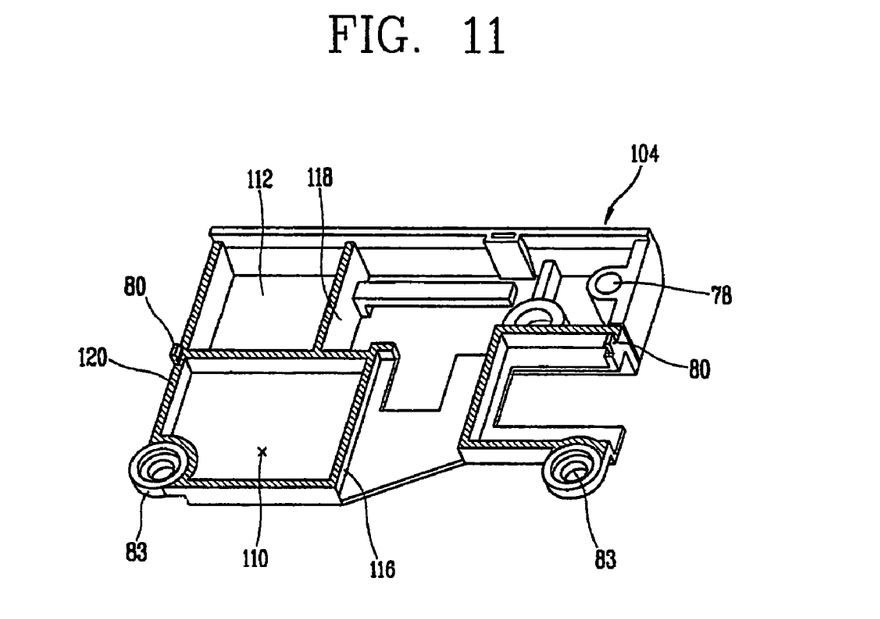
FIG. 11 is a diagram showing a perspective view of a carrier of an internal antenna in accordance with another embodiment of the present invention.

FIG. 9 is a diagram showing an exploded perspective view of a main body of a mobile terminal in accordance with another embodiment of the present invention. FIG. 10 is a partially cut perspective view of the main body of the mobile terminal in FIG. 9, and FIG. 11 is a perspective view of a carrier of an internal antenna in accordance with another embodiment of the present invention.

As shown in FIG. 9, another embodiment of an internal antenna and the mobile terminal housing the same is similar to FIG. 5. However, the embodiment of a carrier 104 of an internal antenna 102 has a different structure.

As shown in FIG. 9, the carrier 104 of the internal antenna 102 can include a fixing hole 78 formed at one side thereof, in which the feeding terminal 76 can be insertedly fixed, a plurality of engaging hooks 80 or the like preferably formed at a marginal portion thereof and configured to be fixed to the main PCB 54, and a screw engaging hole 83 or the like preferably formed at a corner portion thereof so as to be screw-engaged with the front case 50 and the rear case 52. At one side of the carrier 104, there can be provided a first shielding part 110 for shielding the RF element 82 mounted on the main PCB 54 and a second shielding part 112 for shielding a connector 108 of a front PCB 106. The front PCB 106 can be a section of the main PCB 54 where electromagnetic wave emitting circuits (e.g., RF element 82) are preferably grouped.

The first shielding part 110 is preferably formed to cover the RF element at one side of the carrier 104 in order to shield electromagnetic waves generated from the RF element 82, and the second shielding part 112 can be integrally formed at the side of the first shielding part to cover the connector 108 (e.g., FPCB connector) of the front PCB 106. Thus, the second shielding part 112 can protect the connector 108 and perform an electromagnetic wave shielding operation. The connector 108 can be a FPCB connector for connection to a flexible PCB that connects a display module or device (e.g., LCD) in the folder 10 to the main PCB 54.

The first shielding part 110 and the second shielding part 112 are made of a polycarbonate material. The carrier 104, the first shielding part 110 and the second shielding part 112 are integrally injection-molded. However, the present invention is not intended to be so limited as other materials and manufacturing methods can be used.

A front PCB refuge groove 114 can be formed at the main PCB 54. The front PCB refuge groove 114 can allow the front PCB connector 108 to be coupled to an LCD module (e.g., of the folder 10) using a flexible PCB (FPCB). The connector 108 of the front PCB 106 can be covered by the second shielding part 112.

An electromagnetic wave shielding film 96 is preferably coated at an entire surface of the inner side and the outer side of the first shielding part 110 and the second shielding part 112 to shield or reduce electromagnetic waves. The electromagnetic wave shielding film 96 can be formed such that a copper film is coated at the surface of the first and second shielding parts 110 and 112 by spraying, vacuum deposition or the like and a corrosion preventing film made of nickel or stainless steel is then coated at the surface of the copper film by spraying, vacuum deposition of the like.

At a marginal portion of the first and second shielding parts 110 and 112, there are formed RF element 82 discharging a large quantity of electromagnetic waves, especially among parts installed on the main PCB 54, and ribs 116 and 118 with a certain height to preferably cover the RF element 82 and the connector 108 of the front PCB 106. A gasket 120 can be attached at an upper surface of the ribs 116 and 118 so as to be tightly attached on the surface of the main PCB 54.

The gasket 120 can be a silicon material having conductivity and elasticity. The gasket 98 is elastically tightly attached (e.g., at a lower surface) to the main PCB 54, preferably making an electric grounding.

As described above, embodiments of internal antennas, mobile terminals having an internal antenna and methods for assembling and using the same in accordance with the present invention have various advantages. For example, since an internal antenna can be mounted directly on (e.g., over) the main PCB, a space (e.g., separate from the main PCB) for installation of the antenna is not necessary inside the main body of the terminal. Thus, the terminal can be compact and made smaller. Further, since an electromagnetic wave shielding part for shielding the RF element can be formed in the internal antenna to shield at least one RF element from which a large amount of electromagnetic wave is generated, leakage of electromagnetic wave can be reliably reduced or prevented. The electromagnetic wave shielding part can include an electromagnetic wave shielding film on inner and outer surfaces.

In addition, since a first shielding part shielding an RF element and the second shield part shielding a front PCB (e.g., a connector) can be formed in an internal antenna, the RF element generating much electromagnetic wave is double-shielded both by the front PCB shielding part connected to the front PCB and by the electromagnetic wave shielding film formed at an inner side of the casing of the main body. Thus, electromagnetic waves can be reliably and effectively shielded. Also, since the internal antenna where the electromagnetic wave shielding member is installed can be simultaneously assembled when the main body casing is assembled, assembly productivity can be enhanced to reduce costs and/or processing time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal, comprising:
   a terminal case;
   a PCB provided inside the terminal case and having various circuit components mounted thereon; and
   an internal antenna mounted on the PCB and configured to transmit and receive radio waves bearing voice and image information to and from the PCB and shield electromagnetic wave generating parts mounted on the PCB, wherein the internal antenna comprises:
      a carrier fixed at one side of a main PCB and configured to have an electromagnetic wave shielding part;
      a radiator attached to the carrier and configured to radiate said radio waves received from the main PCB; and
      a feeding terminal coupled to the carrier and configured to electrically connect the radiator and the main PCB, wherein an electromagnetic shielding film is coated at each of an inner side and an outer side of the electromagnetic wave shielding part.

2. The terminal of claim 1, wherein the carrier comprises a fixing hole into which the feeding terminal is fixed.

3. The terminal of claim 1, wherein the carrier comprises engaging hooks formed at a marginal portion and configured to be engaged to the main PCB.

4. The terminal of claim 1, wherein the carrier comprises an engaging hole, wherein the engaging hole is removably engaged with the terminal case.

5. The terminal of claim 1, wherein the electromagnetic wave shielding part covers an RF element mounted on the main PCB.

6. The terminal of claim 5, wherein the electromagnetic wave shielding part comprises:
   a barrier wall formed in a circumferential direction so that the RF element can be covered when the carrier is attached on a surface of the main PCB.

7. The terminal of claim 6, wherein the electromagnetic wave shielding film comprises a copper film is at a surface of the electromagnetic wave shielding part and a corrosion preventing film including nickel or stainless steel at a surface of the copper film.

8. The terminal of claim 6, comprising a gasket at an upper surface of the barrier wall of the electromagnetic wave shielding part configured to seal the baffler wall and the surface of the main PCB.

9. The terminal of claim 8, wherein the gasket comprises a silicon material having both conductivity and elasticity.

10. The terminal of claim 1, wherein the terminal case comprises:
    a front case and a rear case determining a prescribed space therebetween; and
    an electromagnetic wave shielding film at an inner side of the front case and the rear case.

11. The terminal of claim 10, wherein the electromagnetic wave shielding film is copper and nickel sequentially plated.

12. The terminal of claim 1, wherein the internal antenna is over the PCB.

13. The terminal of claim 1, wherein the radiator is configured to receive and radiate said radio waves transmitted to and received from the main PCB, and wherein the cattier comprises:
    a first shielding part configured to shield an RF element mounted on the main PCB; and
    a second shielding part configured to shield a connector.

14. The terminal of claim 13, wherein the first shielding part is configured to cover the RF element and the second shielding part is configured to cover the connector, wherein the connector is used for a flexible PCB connection to a folder of the mobile terminal.

15. The terminal of claim 14, wherein the first and second shielding parts comprise a polycarbonate material, and wherein the carrier, the first shielding part and the second shielding part are integrally formed.

16. The terminal of claim 14, wherein an electromagnetic wave shielding film is coated at a surface of the outer side and the inner side of each of the first and second shielding parts for shielding electromagnetic waves.

17. The terminal of claim 16, wherein the electromagnetic wave shielding film is a film comprising copper at the surface of the fast and second shielding parts and a corrosion preventing film comprising nickel or stainless steel at the surface of the copper film.

18. The terminal of claim 14, wherein the first and second shielding parts respectively include a rib, and wherein a gasket is attached at an upper surface of the rib and configured to be attached between the surface of the main PCB and the rib for shielding electromagnetic waves.

19. The terminal of claim 13, wherein the main PCB comprises a refuge groove so that the connector connected to a front PCB can be covered by the second shielding part.

20. An internal antenna, comprising:
a carrier inside a communication device and configured to shield electromagnetic wave generating parts;
a radiator coupled to the carrier and configured to receive and radiate radio waves transmitted to and received from the communication device; and
a feeding terminal fixed at the carrier and configured to electrically connect the radiator and an antenna terminal part of the communication device; and
at least one recessed portion provided in the carrier, wherein an inner surface and an outer surface of the recessed portion is covered by an electromagnetic wave shielding film.

21. The antenna of claim 20, comprising a barrier wall around the recess covered by the shielding film.

22. The antenna of claim 20, wherein the carrier comprises:
a fixing hole into which the feeding terminal is connected; and
engaging hooks formed at a marginal portion and configured to engage a main PCB, wherein the carrier comprises an engaging hole, and wherein the engaging hole is removably engaged with a case of the communication device.

23. The antenna of claim 20, wherein the carrier comprises:
a first shielding part configured to shield an RF element mounted on the main PCB; and
a second shielding part configured to shield a connector.

24. The antenna of claim 23, wherein each of the first and second shielding parts comprises:
a barrier wall formed in a circumferential direction so that the RF element can be covered when the carrier is attached on a surface of the PCB; and
an electromagnetic wave shielding film coated at each of an inner side and an outer side thereof for shielding electromagnetic waves, and wherein the internal antenna is over the PCB.

25. The antenna of claim 24, further comprising a gasket at an upper surface of the barrier wall of each of the first and second shielding parts configured to seal the barrier wall and the surface of the main PCB, wherein the gasket comprises a silicon material having both conductivity and elasticity.

26. A mobile terminal, comprising:
a terminal case;
a main PCB inside the terminal case and configured to have various circuit components mounted thereon; and
an internal antenna directly mounted on the main PCB and configured to receive and transmit radio waves bearing voice and image information to and from the main PCB, wherein the internal antenna comprises:
a carrier fixed at one side of a main PCB and configured to have an electromagnetic wave shielding part;
a radiator attached to the carrier and configured to receive and radiate said radio waves transmitted to and received from the main PCB; and
a feeding terminal configured to be coupled to the carrier and to electrically couple the radiator and the main PCB, wherein an electromagnetic shielding film is coated at each of an inner side and an outer side of the electromagnetic wave shielding part.

27. The mobile terminal of claim 26, wherein the internal antenna is mounted over the main PCB.

28. A method for assembling a mobile terminal comprising:
providing a terminal case;
providing a PCB including various circuit components inside the terminal case; and
shielding an electromagnetic wave generating part mounted on the PCB using an internal antenna, wherein the internal antenna comprises:
a carrier inside a communication device and configured to shield the electromagnetic wave generating part;
a radiator coupled to the carrier and configured to receive and radiate radio waves transmitted to and received from the communication device; and
a feeding terminal configured to electrically couple the radiator and an antenna terminal part of the communication device, wherein an electromagnetic shielding film is coated at each of an inner side and an outer side of the electromagnetic wave shielding part.

29. The method of claim 28, comprising:
directly mounting the internal antenna on the PCB, wherein the internal antenna is configured to transmit and receive radio waves bearing voice and image information to and from the PCB.

30. A mobile terminal, comprising:
a terminal case;
a PCB provided inside the terminal case and having various circuit components mounted thereon; and
an internal antenna mounted on the PCB and configured to transmit and receive radio waves bearing voice and image information to and from the PCB and shield electromagnetic wave generating parts mounted on the PCB, wherein the internal antenna comprises:
a carrier fixed at one side of the PCB,
a radiator attached to the carrier and configured to receive and radiate said radio waves transmitted to and received from the PCB, and
a feeding terminal configured to be coupled to the carrier and to electrically couple the radiator and the PCB, wherein the carrier comprises:
a first shielding part configured to shield an RF element mounted on the main PCB; and
a second shielding part configured to shield a connector.

31. A mobile terminal, comprising:
a terminal case;
a PCB provided inside the terminal case and having various circuit components mounted thereon; and
an internal antenna mounted on the PCB and configured to transmit and receive radio waves bearing voice and image information to and from the PCB and shield electromagnetic wave generating parts mounted on the PCB, wherein the internal antenna comprises:
a carrier fixed at one side of a main PCB and configured to have an electromagnetic wave shielding part;
a radiator attached to the carrier and configured to radiate said radio waves received from the main PCB; and
a feeding terminal coupled to the carrier and configured to electrically connect the radiator and the main PCB, wherein the terminal case comprises a front case and a rear case determining a prescribed space therebetween and an electromagnetic wave shielding film at an inner side of the front case and the rear case, and wherein the electromagnetic wave shielding film is copper and nickel sequentially plated.

32. A mobile terminal, comprising:
a terminal case;
a PCB provided inside the terminal case and having various circuit components mounted thereon; and
an internal antenna mounted on the PCB and configured to transmit and receive radio waves bearing voice and image information to and from the PCB and shield electromagnetic wave generating parts mounted on the PCB, wherein the internal antenna comprises:
  a carrier fixed at one side of a main PCB and configured to have an electromagnetic wave shielding part;
  a radiator attached to the carrier and configured to radiate said radio waves received from the main PCB; and
  a feeding terminal coupled to the carrier and configured to electrically connect the radiator and the main PCB, wherein the radiator is configured to receive and radiate said radio waves transmitted to and received from the main PCB, and wherein the carrier comprises:
  a first shielding part configured to shield an RF element mounted on the main PCB; and
  a second shielding part configured to shield a connector.

33. An internal antenna, comprising:
a carrier inside a communication device and configured to shield electromagnetic wave generating parts;
a radiator coupled to the carrier and configured to receive and radiate radio waves transmitted to and received from the communication device; and
a feeding terminal fixed at the carrier and configured to electrically connect the radiator and an antenna terminal part of the communication device;
at least one recessed portion provided in the carrier, wherein at least one of an inner surface and an outer surface of the recessed portion is covered by an electromagnetic wave shielding film; and
a barrier wall around the recessed portion.

34. An internal antenna, comprising:
a carder inside a communication device and configured to shield electromagnetic wave generating parts;
a radiator coupled to the carrier and configured to receive and radiate radio waves transmitted to and received from the communication device; and
a feeding terminal fixed at the carder and configured to electrically connect the radiator and an antenna terminal part of the communication device; and
at least one recessed pardon provided in the carrier, wherein at least one of an inner surface and an outer surface of the recessed portion is covered by an electromagnetic wave shielding film, and wherein the carrier comprises:
a first shielding part configured to shield an RF element mounted on a PCB; and
a second shielding part configured to shield a connector.

35. A mobile terminal, comprising:
a terminal case including a front case and a rear case;
a main PCB provided inside the terminal case between the front case and the rear case;
a carrier fixed at one side of a main PCB and configured to have an electromagnetic wave shielding part coating an RF element mounted to the main PCB; and
a radiator attached to the carrier and configured to radiate waves transmitted and received from the main PCB, wherein the carrier includes:
  an electromagnetic wave shielding film coated at the electromagnetic radio wave shielding part;
  a feeding terminal fixed on the carrier and configured to electrically connect between the radiator and the main PCB; and
  engaging hooks formed at a marginal portion and engaged to the main PCB.

36. A mobile terminal, comprising:
a terminal case including a front case and a rear case;
a main PCB provided inside the terminal case between the front case and the rear case;
a carrier fixed at one side of a main PCB and configured to have an electromagnetic wave shielding part coating a RF element mounted to the main PCB; and
a radiator attached to the carrier and configured to radiate waves transmitted and received from the main PCB, wherein the carrier includes:
  an electromagnetic wave shielding film coated at the electromagnetic radio wave shielding part;
  a feeding terminal fixed on the carrier and configured to electrically connect between the radiator and the main PCB; and
screw engaging holes formed at a carrier margin to provide a close seal between the carrier and the main PCB by engaging the carrier and the main PCB to the terminal case each by a screw.

* * * * *